Nov. 3, 1964  J. D. STERRETT, JR  3,155,219
POSITION CONTROL APPARATUS
Filed Feb. 19, 1963  3 Sheets-Sheet 1
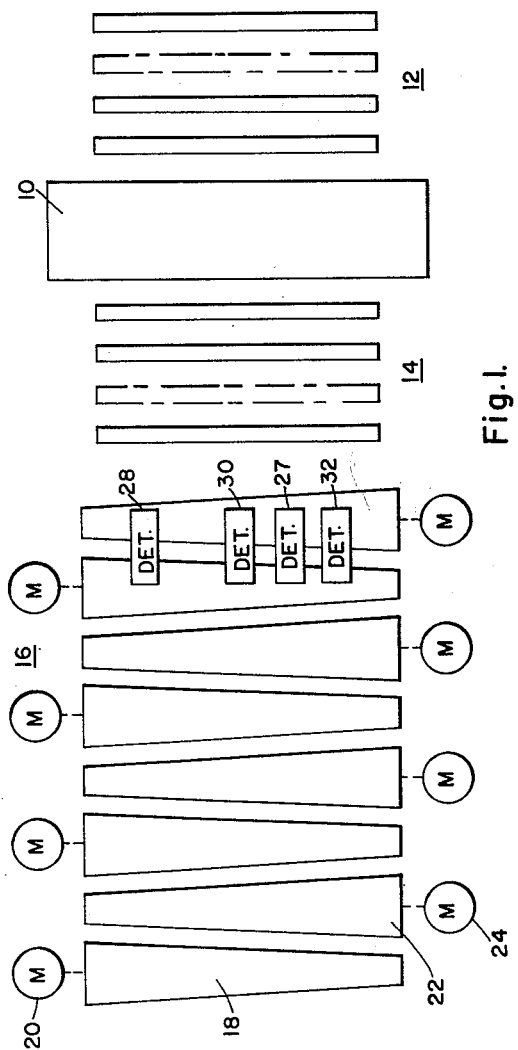
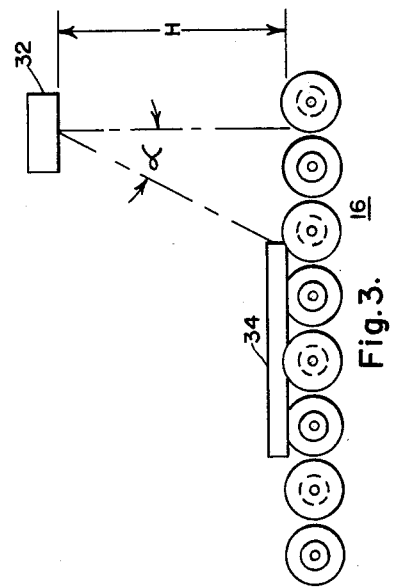
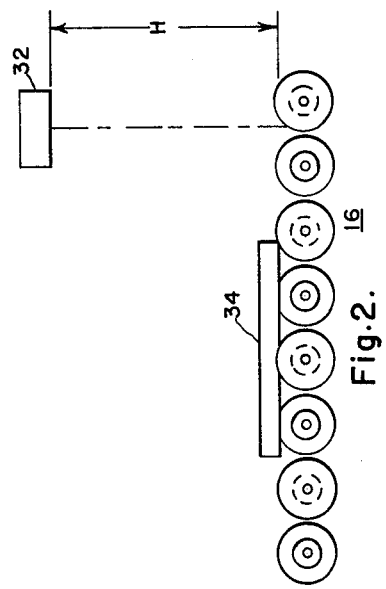
WITNESSES
Theodore F. Wrobel
James F. Young
INVENTOR
John D. Sterrett, Jr.
BY R.W. Brodahl
ATTORNEY Nov. 3, 1964  J. D. STERRETT, JR  3,155,219
POSITION CONTROL APPARATUS
Filed Feb. 19, 1963  3 Sheets-Sheet 2

United States Patent Office 3,155,219
Patented Nov. 3, 1964

3,155,219
POSITION CONTROL APPARATUS
John D. Sterrett, Jr., Penn Hills, Pa., assignor to Westinghouse Electric Corporation, Pittsburgh, Pa., a corporation of Pennsylvania
Filed Feb. 19, 1963, Ser. No. 259,590
6 Claims. (Cl. 198—33)

The present invention relates in general to workpiece position control apparatus and more particularly to apparatus for controlling the movement position of a workpiece such as a hot metal slab rotating on the workpiece turning tables operative with a rolling mill.

In the rolling operation of metal slabs in certain primary mills such as reversing roughers and plate mills, it is often required to turn the workpiece relative to the rolling mill. As an example, a slab being rolled into plate might be initially rolled lengthwise a few passes then turned and rolled to a desired width dimension and subsequently turned again and rolled in a plurality of passes to a predetermined and desired thickness. The turning operation is accomplished with spin tables generally consisting of tapered table rolls each driven by a separate drive motor, with the alternate rolls being tapered in opposite directions and driven from opposite sides of the mill table such that when the rolls tapered in a first direction are driven forward and the rolls tapered in the opposite direction are driven in reverse the workpiece will turn or spin on the rolls. Due to slippage of the rolls relative to the metal workpiece, however, it is necessary to physically determine the angular or rotational position of the workpiece relative to a reference position or the rolling mill. In the prior art practice, the workpiece turn operation has been manually controlled with a human operator acting to monitor the movement position of the workpiece.

It is an object of the present invention to provide improved workpiece position control apparatus for better rotating or turning a workpiece, to improve the control of the turn operation such that less time is required and it is performed automatically and with greater uniformity.

It is a different object of the present invention to provide improved workpiece movement control apparatus to better control a desired turn movement operation of a workpiece relative to a reference position and cooperative with a rolling mill, with a considerable amount of lateral workpiece movement being permissible.

In accordance with the present invention workpiece position control apparatus is provided including three position detectors arranged transverse to the travel path of a workpiece through a rolling mill, which detectors are operative to sense the position of the workpiece as it turns relative to a reference position and to provide control signals to a signal comparison apparatus such as a computer for determining the angles scanned by the respective detectors between a workpiece surface and a predetermined reference. With the scanned angles available, the distances between the workpiece surface and a predetermined reference line can be determined such that in turn the angular position movement of the workpiece can be determined sequentially in accordance with the cycle provided by the timer device. The movement of the workpiece is thereby sensed to determine a predetermined position of the workpiece at which the turning movement provided by the spin table rollers should be stopped. When the actual position of the workpiece corresponds to this predetermined desired turn stopping position, the kinetic energy of the workpiece will cause it to move into a desired end of turn position at which the workpiece can be moved back toward the mill.

These and other objects and advantages of the present invention will become apparent in view of the following description taken in conjunction with the drawings wherein:

FIGURE 1 is a top view of the turn tables showing the tapered roll members supporting a workpiece relative to the provided position sensing detector devices;

FIG. 2 is a side view illustrating one detector device in its reference scan position;

FIG. 3 is a side view of this same detector device sensing the actual position of the workpiece;

Figure 4A:
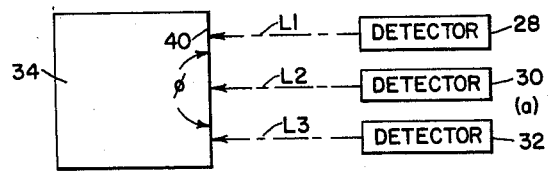
FIG. 4 is a diagrammatic view illustrating the operation of the present control apparatus in a sequence of movement positions shown in FIGS. 4a through 4g from the initial workpiece position to the final end of turn workpiece position.

In FIG. 1 there is shown a rolling mill 10 with a roll table 12 bringing workpieces into the entry side of the rolling mill 10 and a roll table 14 for moving workpieces relative to the opposite side of the rolling mill 10. A spin table 16 is shown including a plurality of tapered rollers 18, each driven by a separate motor such as the motor 20 operative to drive the roll member 18. The next adjacent roll member 22 is driven by a separate drive motor 24. A hot metal workpiece detector 27 is positioned relative to the roll tables 14 for sensing the passage of a workpiece out of the rolling mill 10 and onto the spin table 16. A hot metal position detector 28 is positioned above the spin table 16 and to the right of center thereof. A hot metal position detector 30 is similarly positioned above the spin table 16 but at the center thereof, and a hot metal detector position 32 is positioned above the spin table 16 at the opposite side thereof relative to the hot metal detector 28.

In FIG. 2 there is shown a side view of the spin table 16 with a workpiece 34 positioned on the spin table 16. One of the hot metal detectors, for example the position detector 32, is shown operative to scan the reference or beginning measurement position for determining the position of the workpiece 34 on the spin table 16. It should be noted that the hot metal position detectors are each positioned at a distance H above the support plane of the spin table 16.

In FIG. 3 the detector 32 is shown scanning the actual position of the workpiece 34 supported by the spin table 16.

Figure 4B:
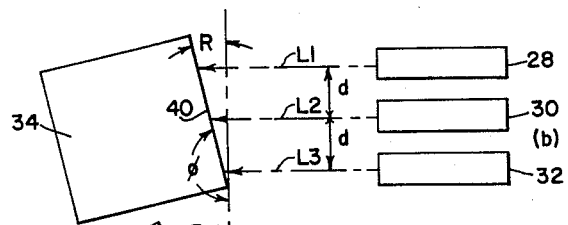
Figure 4C:
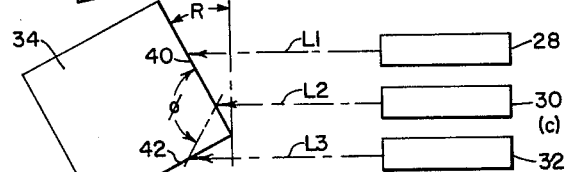
Figure 4D:
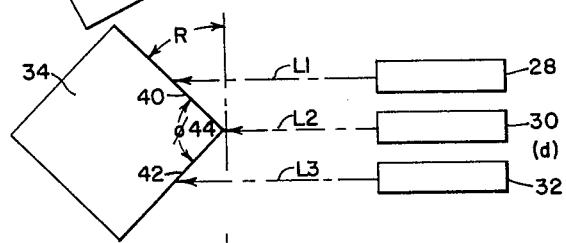

In FIG. 4a the workpiece 34 is shown supported on the spin table with the position detectors 28, 30 and 32 being operative to measure a distance L1, L2 and L3 respectively relative to the side surface 40 of the workpiece 34. In FIG. 4b the workpiece 34 is shown as it has started to turn with the side 40 still exposed to each of the position detectors 28, 30 and 32. It should be noted that the distances L1, L2 and L3 have all changed as a result of the turn movement of the workpiece 34. In FIG. 4c the workpiece 34 has still further increased the amount of its turn movement such that the side 40 is exposed only to the position detectors 28 and 30 whereas the position detector 32 is now exposed to side 42 of the workpiece 34. It should be noted that each of the dimensions L1, L2 and L3 have again changed relative to the reference line 44. In FIG. 4d the workpiece 34 has still further increased its turn movement as a result of the operation of the spin table such that the workpiece side 40 is exposed only to the position detector 28. The position detector 30 senses the position of the corner 44 of the workpiece 34 whereas the side 42 is exposed to the position detector 32. The dimensions L1, L2 and L3 are again measured in this illustrative position of the workpiece 34. In FIG. 4*l* the workpiece 34 has still further increased its turn movement such that the side 40 is exposed to the position detector 28 whereas the side 42 is now exposed to each of the position detectors 30 and 32. The dimensions L1, L2 and L3 are determined in this illustrative position. In FIG. 4*f* the workpiece 34 has still further increased its turn movement such that the side 40 is no longer exposed to any of the position detectors and instead the side 42 is exposed to each of the position detectors 28, 30 and 32. The dimensions L1, L2 and L3 are determined for this illustrative position of the workpiece 34. In FIG. 4*g* the workpiece 34 has assumed its desired end of turn position with the side 42 substantially perpendicular to the travel path through the rolling mill. The position detectors 28, 30 and 32 each sense an equal distance L1, L2 and L3 in this position of the workpiece 34.

Figure 5:
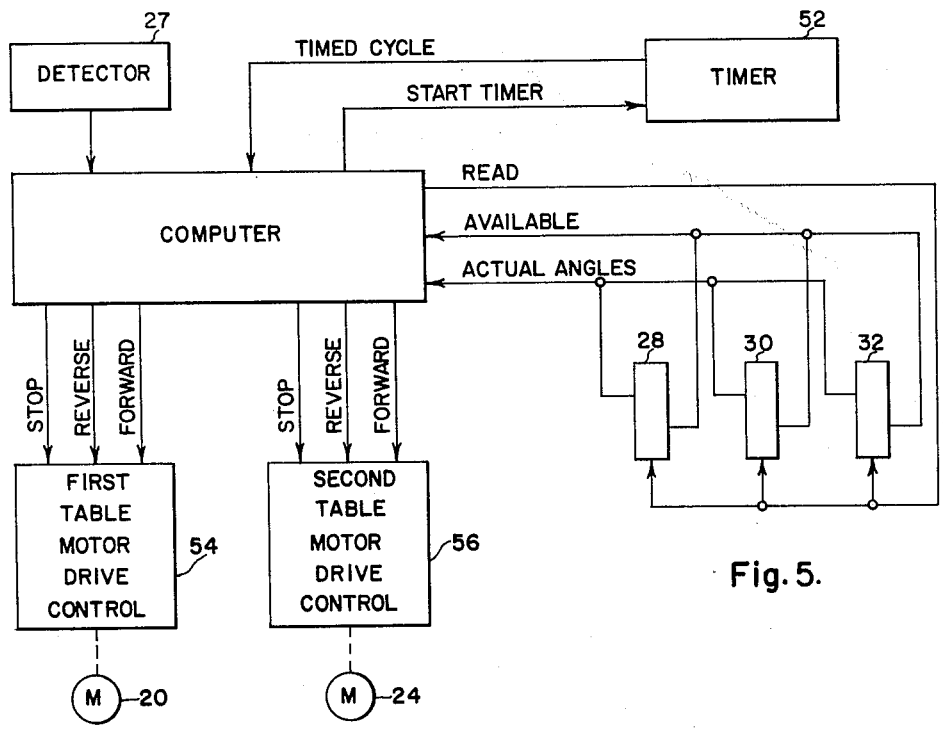
FIG. 5 is a diagrammatic showing of the present control apparatus.

In FIG. 5 there is diagrammatically shown one embodiment of the present position control apparatus, with the workpiece detector 27 being operative to provide a control signal to a computer 50 operative with a timer device 52 for providing a desired turn angle reading operation sequence in the order of every $2/10$ of a second for reading sequentially thereby the angles measured by the position detector devices 28, 30 and 32. The computer controls the forward, reverse and stop operations of the first table motor drive control 54 operative with each of a first group of table motors, for example, the table motors including the table motor 20 and for controlling the forward, reverse and stop operation of a second table motor drive control operative with the second group of table motors including the table motor 24.

Figure 6:
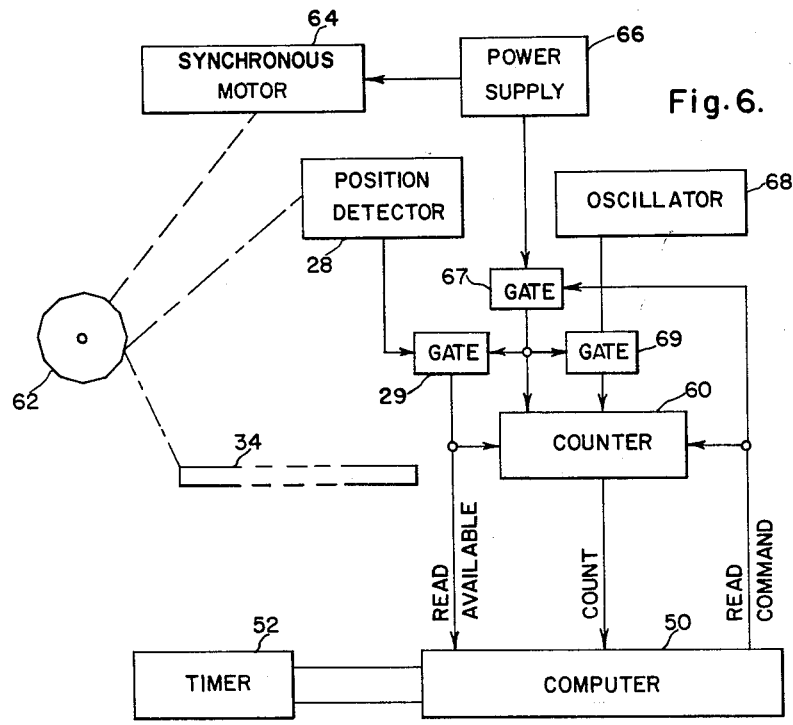
FIG. 6 is a schematic showing of the control apparatus operative with the position detector device.

In FIG. 6 there is shown one of the position detectors for example, the position detector 28 operative with a counter 60 in accordance with infrared energy from the workpiece 34 as reflected from one of twelve provided reflecting surfaces of a scanning member 62 rotated at a substantially constant frequency by a synchronous motor 64 energized by a power supply 66. In this regard the power supply 66 furnishes energy at 60 cycles per second, and the counter senses each half cycle of this power supply as a reference pulse such that it receives 120 reference pulses per second. The synchronous motor 64 is designed to operate at 600 revolutions per minute such that the scanning member 62 rotates at a speed of 10 revolutions per second. This means that with 12 scanning surfaces, 120 scans are made per second of the actual position of the workpiece 34. The oscillator 68 is provided to supply 10,000 cycles per second signals to the counter as will be later explained. Thusly, the counter 60 is operative to count the oscillations from the oscillator 68 between each of the reference pulses supplied by the power supply 66 to the counter at 120 cycles per second. The counter 60 is responsive to the reference pulse from the power supply 66 through a gate circuit 67 opened by a read command signal from the computer 50. The counter 60 is operative to begin counting the oscillations from the oscillator 68 through a gate circuit 69 opened by each reference signal from the power supply 66. This reference pulse or signal also opens the gate circuit 29. The counter 60 continues to count such oscillations until a subsequent reference pulse is received which would indicate that no workpiece is positioned within the scan range of the scanning device 62. The counter 60 is stopped in its counting of the oscillations from the oscillator 68 by a control signal from the position detector 28, which closes the gate circuit 69 and indicates that a workpiece 34 is within the scan range. The number of oscillations so counted by the counter 60 determines the position of the workpiece 34 within this scan range and relative to the reference position.

The computer 50 is operative to start the operation of the timer 52 and, after an approximately $2/10$ of a second delay period, the timer causes the computer 50 to read the count level of each counter operative with the respective position detectors, corresponding to the counter 60 operative with the position detector 28. In this regard the computer provides a read signal to each of the counters and associated gate circuits, and if a workpiece is within the scan range of any of the provided position detectors then a count available signal is provided back to the computer and the computer 50 then reads the stored count level of the associated counter. The next read command resets the counter and again cycles the position of the workpiece.

In this regard it should be noted that the workpiece 34 may weigh up to 17 or 18 tons and it is desired to complete the turn operation in approximately 3 to 5 seconds.

It should be noted that the workpiece position detector devices per se are well known in this particular art and there are several forms of suitable devices at present available and known to persons skilled in this particular art which would be suitable for use with the present invention.

To explain the operation of the present control apparatus in greater detail, reference will now be made to FIG. 4. The three position detectors 28, 30 and 32 are arranged across the table transverse to the movement path of the workpiece through the rolling mill. When a read command is sent by the computer to the position detectors, which for purposes of general explanation are considered to include the counter and ancillary equipment as shown in FIG. 6, the angle alpha for each of the position detectors as shown in FIG. 3 are determined and a read available signal is sent by the respective position detectors to the computer when the angles are available for read in. In this regard the position detectors each normally scan an angle of approximately 60° and it is only when a workpiece is positioned within this 60° range that a read available signal is sent by any position detector to the computer. The angle alpha for each of the position detectors as shown in FIG. 3 is the angle each detector scans from a reference line to the side surface of the workpiece 34 in accordance with the actual position of the workpiece 34. With the angle alpha for each of the position detectors 28, 30 and 32 available, the dimensions L1, L2 and L3 respectively can be determined in accordance with the dimension H times the tangent of the angle alpha for each of the detectors respectively.

Now with reference to FIG. 4*b* in particular, as the workpiece 34 begins its turn movement an angle R, which is the angle the workpiece has turned, can be determined trigonometrically as the arc tangent of the difference $(L1-L2)$ divided by the distance $d$ between each of the position detectors. This is true for the FIG. 4*b* condition and the FIG. 4*c* condition where the position detectors 28 and 30 each sense the position of the workpiece side 40.

It is necessary to determine which position detectors are detecting the same side of the workpiece 34. Notice that as the workpiece 34 turns in position in the sequence shown in FIG. 4 it is necessary to determine when the position detector 30 reaches the corner and starts detecting the side 42. The angle $\phi$ which starts at 180° in FIG. 4*a* decreases until it is 90° as shown in FIG. 4*d*. When the position detector 30 detects the corner of the workpiece 34 between the side 40 and the side 42, this angle $\phi$ then increases as the workpiece 34 continues its turn movement until it again reaches 180° as shown in FIG. 4*g* when the side 42 is perpendicular to the rolling mill. The angle R for the workpiece positions shown in FIG. 4*e*, 4*f* and 4*g* can be determined as the arc tangent of the quantity $d$ divided by $(L3-L2)$.

The computer 50 shown in FIG. 5 controls the spin turn of the workpiece 34, when the workpiece has reached a suitable work path position on the spin table 16. This can be determined by a workpiece detector 27 which causes the drive motor for the alternate table rolls to drive in opposite directions to provide the desired spin or turn movement of the workpiece. When the workpiece detector 27 provides an output signal to the computer 50, this causes a start timer signal to be supplied to the timer 52. After the desired 2/10 of a second delay provided to minimize occupation time of the computer 50 since the computer 50 is controlling the whole operation of the rolling mill, including the spin table, the operation of the entry tables, the scale breaker and even perhaps a mushroom turn device prior to the workpiece reaching the rolling mill, the timer provides a timed cycle signal back to the computer 50 which causes the computer to send a read command to the position detectors 28, 30 and 32 and another start timer signal is sent to the timer 52. When the position detectors 28, 30 and 32 have available a reading of the angles alpha, these angles are supplied to the computer. The computer then calculates the distances L1, L2 and L3 and the angle R in accordance with the previously given arc tangent formulas, depending upon the side 40 of the workpiece being sensed by the position detectors 28 and 30 on the one hand and the side 42 being sensed by the position detectors 30 and 32 on the other hand. In addition, the computer determines a predetermined position or workpiece turn angle $R_S$ for stopping the turn movement by the table roll motors such that the kinetic motion of the workpiece 34 will cause it to end the turn in the position shown in FIG. 4g. This predetermined workpiece position angle $R_S$ can be determined as will later be explained. If the actual turn angle R is less than the predetermined angle $R_S$ the workpiece turn movement is not stopped and the timer 52 is allowed to repeat the measurement sequence or cycle. The measurement process sequence is continued until the actual turn angle R is greater than or equal to the predetermined position angle $R_S$, when the table motors are stopped and the control of the turn by the present control apparatus is completed.

At the beginning of the turn movement, such as shown in FIG. 4b, a reference digit is sent to the computer memory to indicate that the position detectors 28 and 30 are detecting the same side 40 of the workpiece 34. After the angle alpha for each position detector has been read in, the distances L1, L2 and L3 respectively, are calculated. The angle $\phi$ will decrease to 90° until the position detector 30 senses the corner 44 between the side 40 and the side 42 and then the angle $\phi$ increases. It is only necessary for the computer to determine if this angle $\phi$ is increasing to know if the position detector 30 is detecting the same edge as is the position detector 32. The angle $\phi$ is equal to 180° minus the quantity arc tangent $$\frac{L1-L2}{d}$$

plus arc tangent $$\frac{L3-L2}{d}$$

Figure 4E:
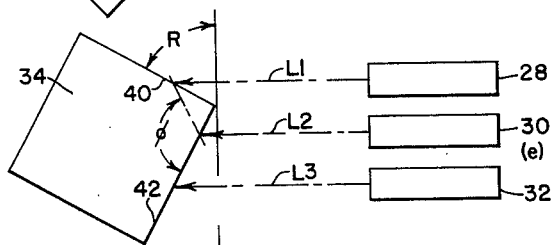
Figure 4F:
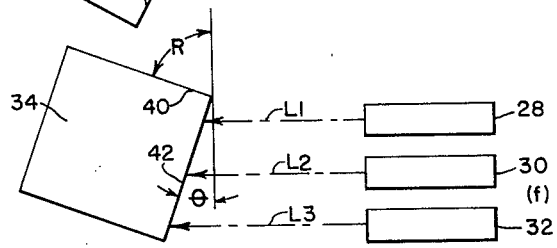
Figure 4G:
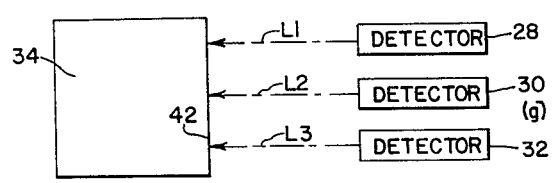

The angle $\phi$ will be increasing if the quantity $$N=L1+L3-2L2$$

decreases. This quantity N is obtained through simplification of the above arc tangent formula. After the distances L1, L2 and L3 respectively, are calculated, the latter quantity N is determined and compared with the quantity N of a previous sequential sample $N_{n-1}$. In this regard it should be noted that the turn angle R can be determined by the formula $$R=\tan^{-1}\frac{L1-L2}{d}$$

until the calculated quantity N becomes less than a previously calculated quantity $N_{n-1}$. Then the equation for the turn angle $$R=\tan^{-1}\frac{d}{L3-L2}$$

will be used for the remaining portion of the workpiece turn as shown in FIGS. 4e and 4f.

It is necessary to determine the predetermined position angle $R_S$ for initiating the stop of the slab 34 by deenergizing the spin table motors. If for example the spin table motors are deenergized when the workpiece slab 34 is in the position shown in FIG. 4f, the angle theta represents the additional turn movement of the workpiece 34 before it comes to rest in the FIG. 4g position, which additional turn movement angle is dependent upon the kinetic energy of the workpiece 34. The kinetic energy of the workpiece can be determined by the mass moment of inertia $J_M$ times the square of the angular velocity $\omega$ of the slab divided by 2, in accordance with the well known formula for kinetic energy $$KE=\frac{J_M\omega^2}{2}$$

The mass moment of inertia $J_M$ is equal to 1/12 times the weight of the slab divided by acceleration of gravity $g$ times the quantity (length of the slab L squared plus width of the slab S squared)

$$J_M=\frac{1}{2}\left(\frac{W}{g}\right)(L^2+S^2)$$

The kinetic energy equals the torque T against the slab (assumed constant) times the angle theta ($KE=T\theta$) and the torque is equal to $\mu$ (the coefficient of friction) times the weight W times the average effective torque radius. The effective torque radius of the turn is approximated by the square root of S squared plus L squared $\sqrt{S^2+L^2}$. Simplifying these equations, the angle theta is found as follows, $$\theta=\frac{K\omega^2}{2g(\mu)}$$

Thusly the angle $R_S$ to initiate the stop of the turn movement is $R_S=90-\theta$. In this manner the computer 50 can readily determine the predetermined position angle $R_S$ at which the spin table motors will be deenergized to allow the workpiece 34 to come to a rest position as shown in FIG. 4g.

In one practical embodiment of the position control apparatus in accordance with the present invention, the position detectors 28, 30 and 32 were positioned approximately 15 feet above the workpiece 34 and the dimensions L1, L2 and L3 respectively, were between zero and 20 feet. The dimension $d$ between the position detectors was 18 inches. It should be noted that if desired the position detectors 28, 30 and 32 can be positioned above and to the side of the workpiece path in the event that a lifting crane or a similar device is desired for removing defective workpieces, or the like, from a position adjacent to the spin table 16.

It should be further undeerstood that for each output signal from the timer 52, the computer 50 read the angles alpha for each position detector 28, 30 and 32 and determined the distances L1, L2 and L3 respectively, and the number N was calculated and stored. Thusly at a 2/10 of a second sequence these angles, distances and quantities were continuously recalculated and stored in the computer memory. When the actual turn angle R was found to be the same as or greater than the predetermined stopping position angle $R_S$, which was in the order of 30°, the computer 50 caused the first table motor drive control 54 and the second table motor drive control 56 to discontinue turning the workpiece. As the workpiece 34 moved into the position shown in FIG. 4g, then the table motors were caused to each operate in the same direction to return the workpiece 34 back in the direction toward the rolling mill.

It was observed that a heavy workpiece of above average thickness, i.e. a workpiece weighing at least 40,000 pounds and having a thickness greater than 15 inches, may require a position angle $R_S$ greater than 30 degrees and for the lighter and thinner workpieces a position angle $R_S$ in the order of 30 degrees appears to be suitable.

Although the present invention has been described with a certain degree of particularity it should be understood that the present disclosure has been made only by way of example and that numerous changes in the details of construction and the combination and arrangement of parts may be resorted to without departing from the scope and spirit of the present invention.

I claim as my invention:

1. Position control apparatus for a moving workpiece having first and second portions and including first position sensing means operative with the workpiece to provide a plurality of first control signals in accordance with the movement positions of the first portion of the workpiece, second position sensing means operative with the workpiece to provide a plurality of second control signals in accordance with the movement positions of the second portion of the workpiece, signal comparison means sequentially responsive to the first control signals and the second control signals for sensing the turn movement of the workpiece relative to a predetermined position, and workpiece movement control means operative with the signal comparison means for controlling the movement of the workpiece into said predetermined position.

2. Position control apparatus for a moving workpiece having first and second portions, including first position detector means operative with the workpiece to provide a first control signal which changes in accordance with the actual movement positions of the first portion of the workpiece relative to a reference position, second position detector means operative with the workpiece to provide a second control signal which changes in accordance with the actual movement positions of the second portion of the workpiece relative to a reference position, signal comparison means responsive to the changes of each of the first control signal and the second control signal as the workpiece moves for sensing the movement of the workpiece relative to a predetermined position, and movement control means operative with the signal comparison means for controlling the movement of the workpiece until it arrives at said predetermined position.

3. Control apparatus for the turning of a workpiece having first and second portions, including first turn position detector means operative with the workpiece to provide sequentially first control signals in accordance with the actual turn positions of said first portion of the workpiece relative to a reference position, second turn position detector means operative with the workpiece to provide sequentially second control signals in accordance with the actual turn positions of said second portion of the workpiece relative to a reference position, timer means operative with said first and second position detector means for providing a predetermined sequence to the provision of the first and second control signals, position comparison means responsive to the differences between the sequential first control signals and the sequential second control signals as the workpiece turns for sensing the turn movement of the workpiece relative to a predetermined position, and turn control means operative with the position comparison means for controlling the movement of the workpiece to arrive at said predetermined position.

4. Position control apparatus for a rotating workpiece having first and second surface portions, including first position detector means operative with the workpiece to provide a plurality of first control signals in accordance with the actual positions of the first surface portion of the workpiece in a predetermined time sequence, second position detector means operative with the workpiece to provide a plurality of second control signals in accordance with the actual positions of the second surface portion of the workpiece in said time sequence, signal comparison means responsive to the plurality of first control signals and the plurality of second control signals as the workpiece moves for sensing the rotation of the workpiece toward a predetermined position, and workpiece rotation control means operative with the signal comparison means for providing a predetermined control of the rotation of the workpiece to cause it to arrive at said predetermined position.

5. Position control apparatus for a moving workpiece having first and second portions, including first position detector means operative with the workpiece to provide a first control signal in accordance with the actual position of the workpiece first side portion relative to a reference position, second position detector means operative with the workpiece to provide a second control signal in accordance with the actual position of the workpiece second side portion relative to a reference position, signal comparison means responsive to each of the first control signal and the second control signal as the workpiece moves for sensing the positional changes of the workpiece first side portion and second side portion relative to said reference position, and movement control means operative with the signal comparison means for controlling the movement of the workpiece until at least one of said side portions arrives at a predetermined position.

6. Position control apparatus for a moving workpiece having first and second side portions, including position detector means sequentially operative with the workpiece to provide a first plurality of control signals in accordance with the actual position of the first side portion of the workpiece relative to a reference position, with said position detector means being sequentially operative with the workpiece to provide a second plurality of control signals in accordance with the actual position of the second side portion of the workpiece relative to a reference position, signal comparison means responsive to the first plurality of control signals and the second plurality of control signals as the workpiece moves for sensing the arrival of the workpiece at a predetermined position, and movement control means operative with the signal comparison means for initiating a change in the movement of the workpiece when it arrives at said predetermined position.

References Cited in the file of this patent

UNITED STATES PATENTS

| 1,340,129 | Williams | May 11, 1920 |
| 2,653,497 | Ebert et al. | Sept. 29, 1953 |
| 3,017,984 | Willard et al. | Jan. 23, 1962 |
| 3,047,123 | McKay | July 31, 1962 |

FOREIGN PATENTS

| 1,114,501 | France | Apr. 13, 1956 |